(12) United States Patent
Peng

(10) Patent No.: US 7,952,859 B2
(45) Date of Patent: May 31, 2011

(54) FIXING DEVICE FOR INDUSTRIAL COMMUNICATION PRODUCT

(75) Inventor: Te-Chun Peng, Sijhih (TW)

(73) Assignee: Etherwan Systems, Inc., Sindian, Taipei County (TW)

( * ) Notice: Subject to any disclaimer, the term of this patent is extended or adjusted under 35 U.S.C. 154(b) by 119 days.

(21) Appl. No.: 12/418,377

(22) Filed: Apr. 3, 2009

(65) Prior Publication Data

US 2010/0255713 A1 Oct. 7, 2010

(51) Int. Cl.
*H05K 7/14* (2006.01)
(52) U.S. Cl. .............. 361/679.02; 361/724; 361/726; 312/223.2
(58) Field of Classification Search ........... 361/679.01, 361/679.02, 724–727, 679.26, 752; 312/223.1–223.2
See application file for complete search history.

(56) References Cited

U.S. PATENT DOCUMENTS

| 2006/0193111 A1* | 8/2006 | Han ........................ 361/683 |
| 2010/0136425 A1* | 6/2010 | Gau et al. ................. 429/187 |

\* cited by examiner

*Primary Examiner* — Jayprakash N Gandhi
*Assistant Examiner* — Ingrid Wright
(74) *Attorney, Agent, or Firm* — Muncy, Geissler, Olds & Lowe, PLLC

(57) ABSTRACT

A fixing device is provided on a casing of an industrial communication product, which includes a fixing plate, at least one elastic piece with an end, a pulling element, and an elastic element. The fixing plate is provided with at least two first connecting portions. The elastic piece is disposed corresponding to the first connecting portions. The pulling element is provided with two stoppers and at least two second connecting portions. The two second connecting portions are slidingly connected to the two first connecting portions. The pulling element is movable between a first position and a second position; wherein when at the first position, the end of the elastic piece abuts the second connecting portion; when at the second position, the end of the elastic piece is stopped by the second connecting portion, and thereby unlocking the industrial communication product, thus making the product accessible for repair and testing.

7 Claims, 10 Drawing Sheets

FIXING DEVICE FOR INDUSTRIAL COMMUNICATION PRODUCT

BACKGROUND OF THE INVENTION

1. Field of the Invention

The present invention relates to a fixing device for an industrial communication product, in particular, to a fixing device for fixing an industrial communication product.

2. Description of Related Art

There are many kinds of industrial communication products widely used in the industry, such as Ethernet, optical fibers, and associated apparatuses. Ethernet is the most popular local network technology. Optical fiber is a light transmitting tool utilizing the total internal reflection of light to transmit light in fibers that are made of glass or plastic materials. The industrial communication products can be widely used in many fields such as factories, stuff delivery, buildings, security, electricity power, transportation, environmental control, etc., so that these products are widely used.

Please refer to FIGS. 1A and 1B. The conventional fixing device for an industrial communication product includes a fixing plate 1a, a pulling element 2a, and a spring 3a. The fixing plate 1a is fixed on a casing 41a of the industrial communication product 4a. The fixing plate 1a is provided with two hooks 11a, two first connecting portions 12a and a stopping block 13a. The two hooks 11a can be hooked on holders 51a of an industrial rail 5a. The pulling element 2a is provided with a compressing portion 21a, two stoppers 22a, and two second connecting portions 23. The compressing portion 21a abuts the stopping block 13a. The two stopping portions 22a can block corresponding stoppers 52 of the industrial rail 5a. The second connecting portions 23a are slidingly connected to the two first connecting portions 12a. The spring 3a is disposed in the pulling element 2a. By means of pulling downwards the pulling element 2a, the pulling element 2a moves downwards to cause the compressing portion 21a to compress the spring 3a. When the two stoppers 22a move away from the corresponding stoppers 52 of the industrial rail 5a, the industrial communication product 4a can be unlocked.

However, when a user intends to repair, test, expand, or upgrade the industrial communication product 4a, the user has to pull downwards the pulling element 2a with one hand to make the industrial communication product 4a unlocked. The user must keep pulling the pulling element 2a to prevent it from locking again due to the elastic restoring force of the spring 3a with one hand, while detaching the industrial communication product 4a with another hand. Thus, such a detachment process is not easy. If the weight of the industrial communication product 4a exceeds to the load that one hand can support, the detachment of such a heavier industrial communication product 4a may hurt the user and the industrial communication product 4a may also suffer damage.

Consequently, because of the above limitation resulting from the technical design of prior art, the inventor strives via real world experience and academic research to develop the present invention, which can effectively improve the limitations described above.

SUMMARY OF THE INVENTION

The objective of the present invention is to provide a fixing device for an industrial communication product. With its construction, a user can detach the industrial communication product easily and thus repair, test, expand, or upgrade it without getting hurt.

To achieve the above-mentioned objective, the present invention provides a fixing device for an industrial communication product, which includes: a fixing plate provided on a casing, the fixing plate being provided with at least one hook, at least two first connecting portions, a stopping block and a first compression portion, the stopping block being positioned to face the first compressing portion; at least one elastic piece disposed with respect to the first connecting portion, the elastic piece having an end; a pulling element provided with a second compressing portion, two stoppers, and at least two second connecting portions, the second compression portion being provided between the stopping block and the first compressing portion, the two stoppers being provided on both sides of the pulling element, the second compressing portion abutting the stopping block, the two second connecting portions being slidingly connected to the two first connecting portions, the pulling element being movable between a first position and a second position, the end of the elastic piece abutting the second connecting portion when the pulling element is in the first position, the end of the elastic piece being stopped by the second connecting portion when the pulling element is in the second position; and an elastic element with its both ends abutting the first compressing portion and the second compressing portion respectively.

The present invention has advantageous features as follows. The elastic piece is disposed with respect to the first connecting portion and has an end acting as a stopper. The second connecting portion is slidingly connected to the first connecting portion. When the pulling element is in the first position, the end of the elastic piece abuts the second connecting portion. When the pulling element is in the second position, the end of the elastic piece stops the second connecting portion. Via this arrangement, the pulling element can be positioned at the second position to unlock the industrial communication product. At this time, the user can detach the industrial communication product from the industrial rail easily for repair, test, expand, or upgrade. Further, the user can be protected from getting hurt during the above-mentioned process.

In order to further understand the techniques, means, and effects the present invention takes for achieving the prescribed objectives, the following detailed descriptions and appended drawings are hereby referred, such that, through which, the purposes, features and aspects of the present invention can be thoroughly and concretely appreciated; however, the appended drawings are merely provided for reference and illustration, without any intention to be used for limiting the present invention.

DETAILED DESCRIPTION OF THE PREFERRED EMBODIMENTS

Figure 1A:
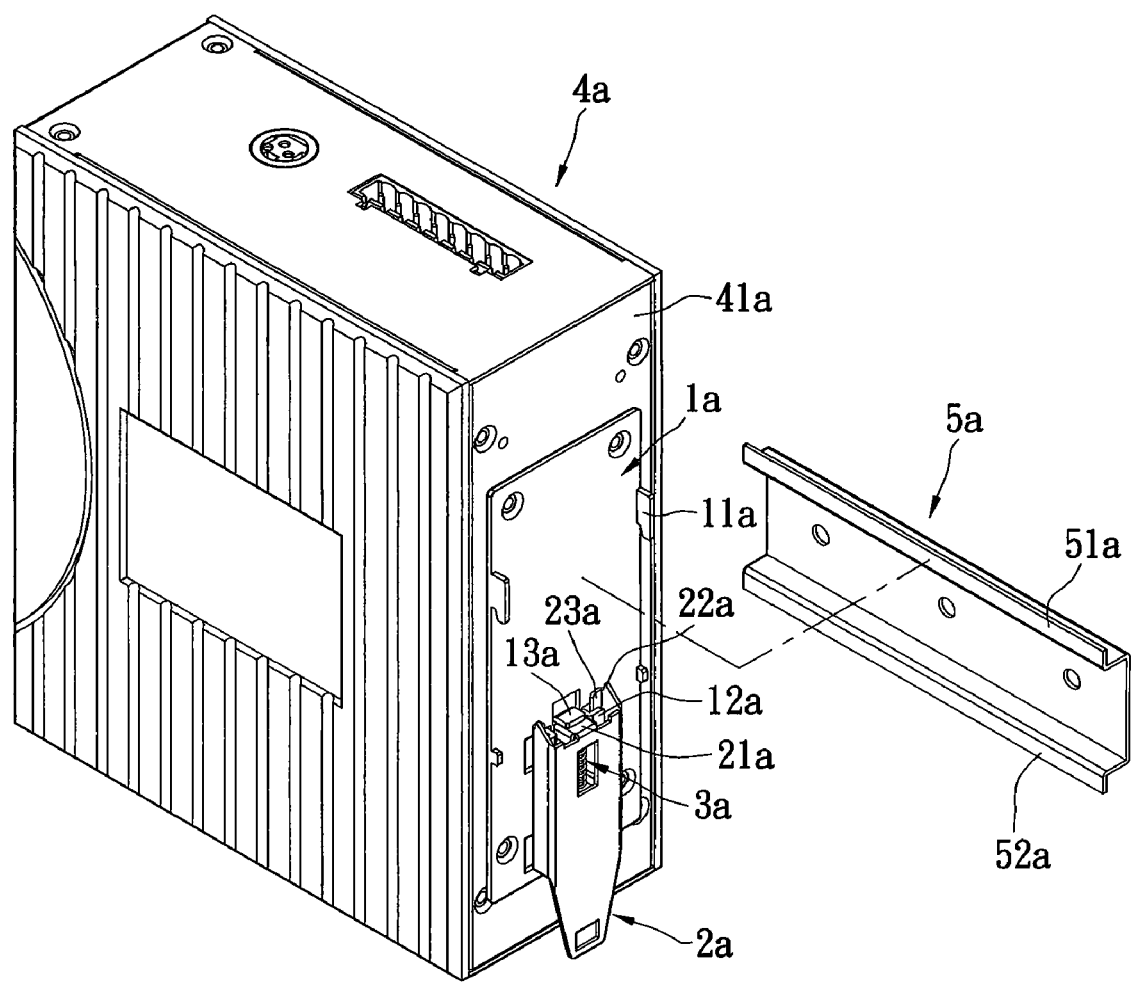
FIG. 1A is a partially exploded perspective view showing a conventional fixing device for an industrial communication product.
Figure 1B:
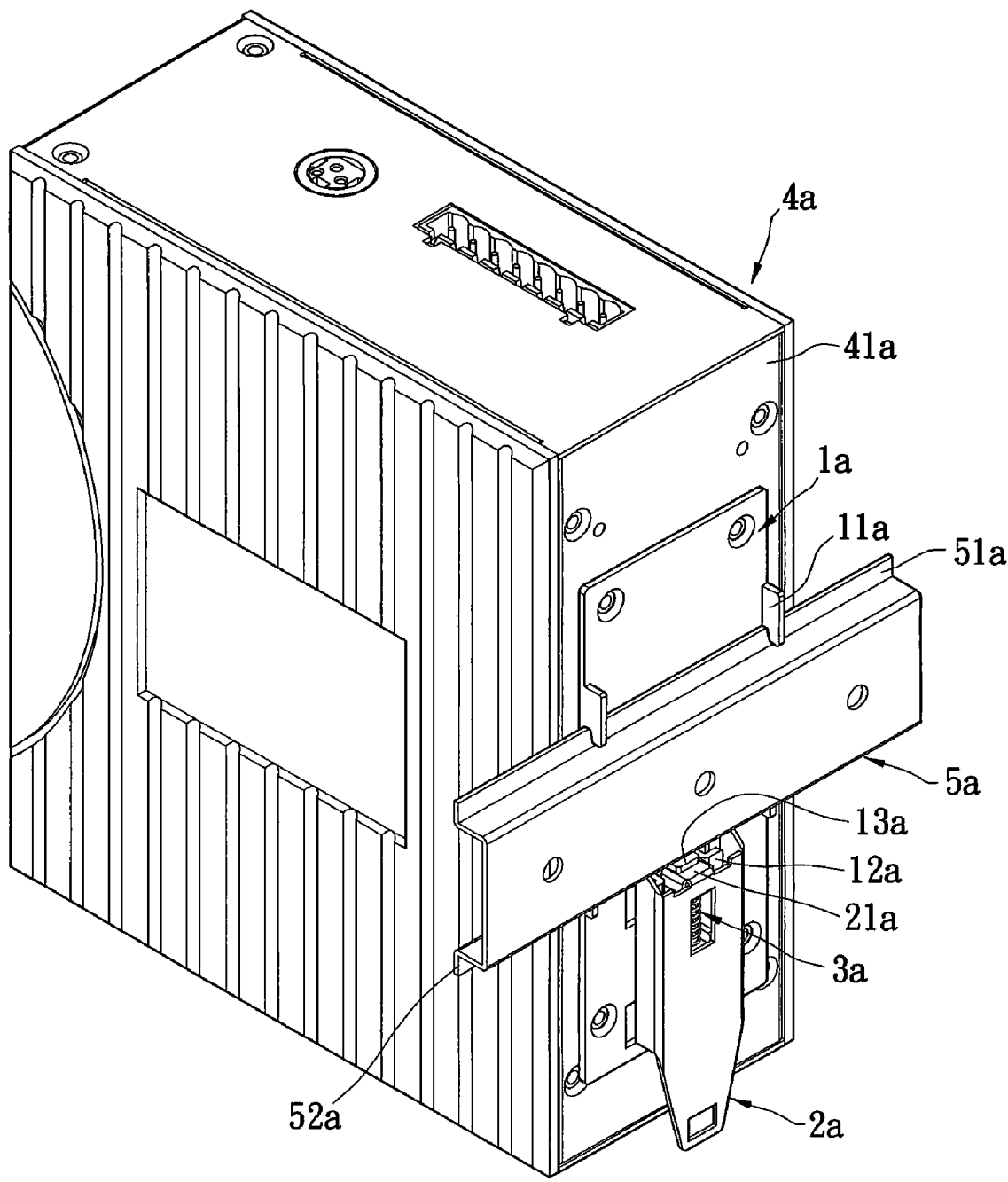
FIG. 1B is a perspective view showing the conventional fixing device for an industrial communication product.
Figure 2:
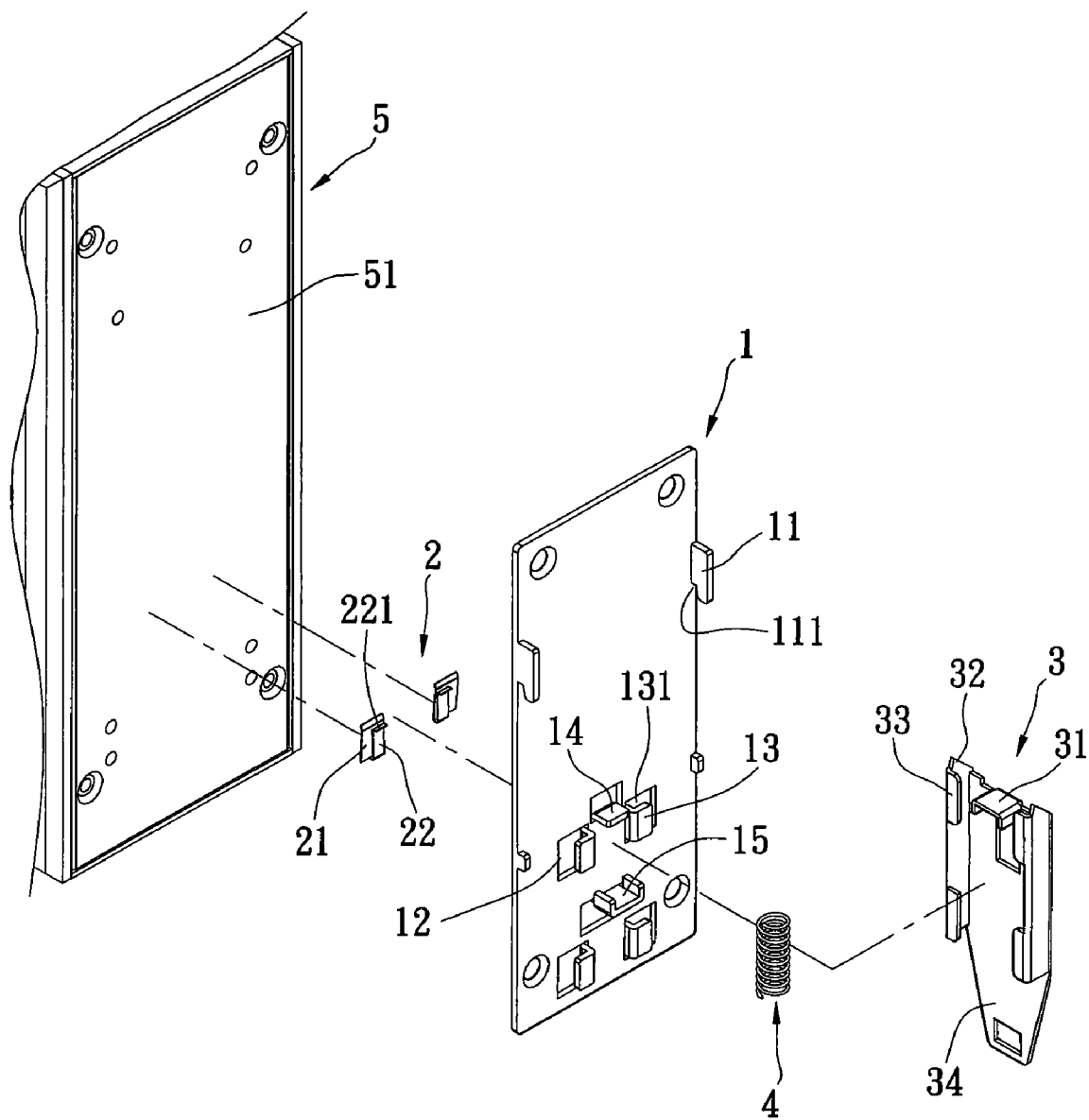
FIG. 2 is an exploded perspective view showing a fixing device for an industrial communication product according to the present invention.
Figure 3:
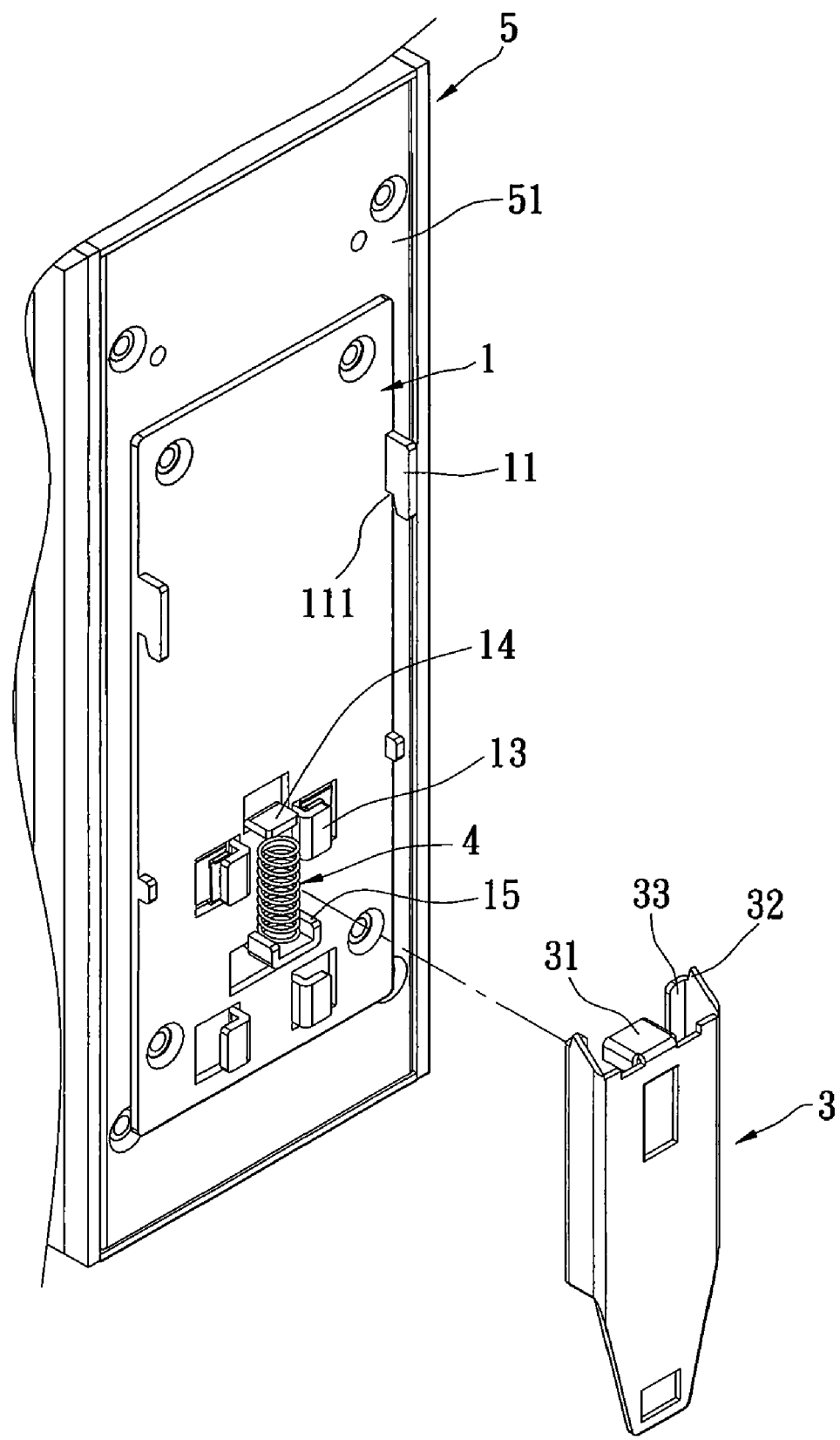
FIG. 3 is a partially exploded perspective view showing the fixing device for an industrial communication product according to the present invention.
Figure 4:
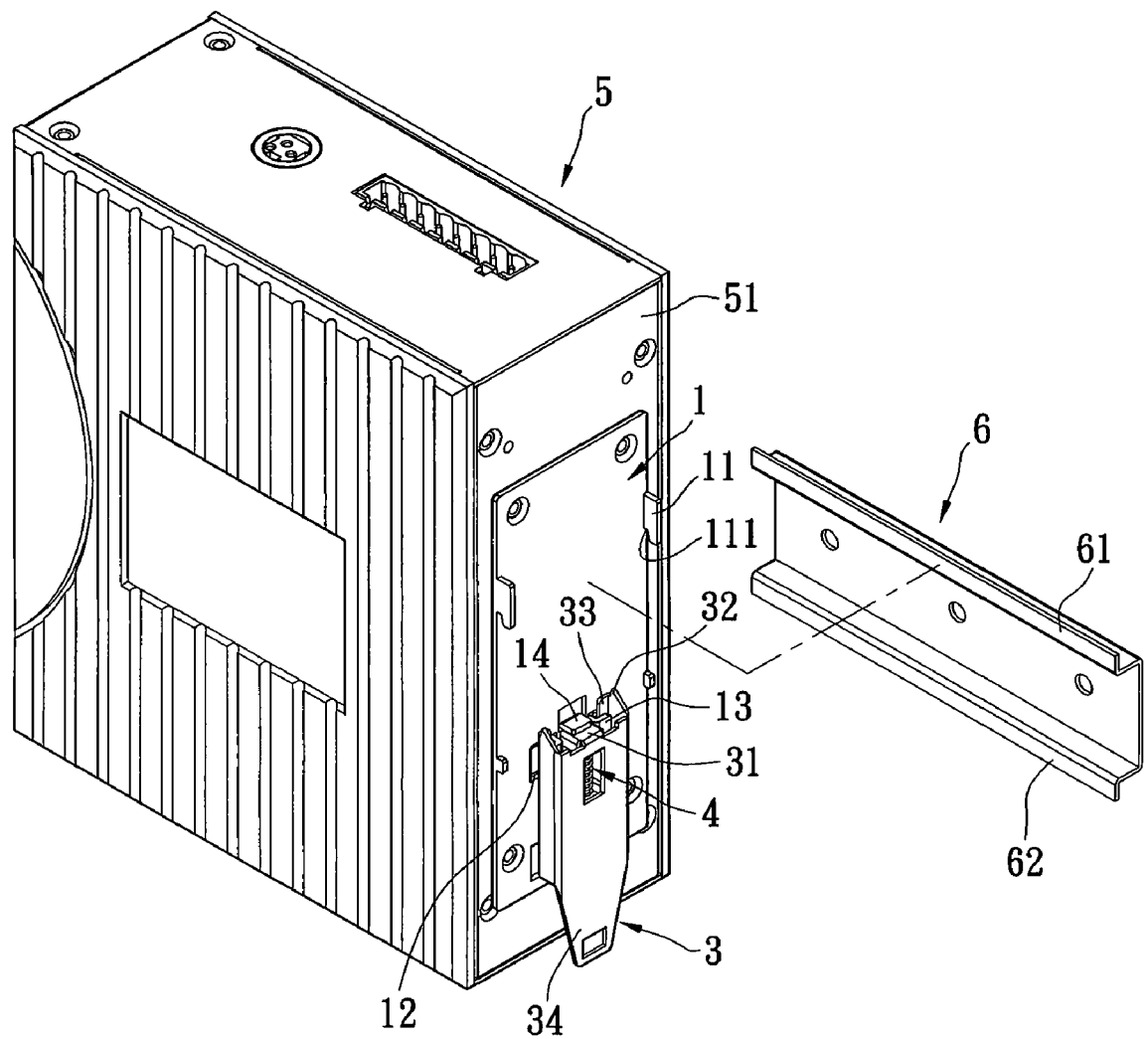
FIG. 4 is a schematic view showing an operating state of the fixing device for an industrial communication product according to the present invention.
Figure 5:
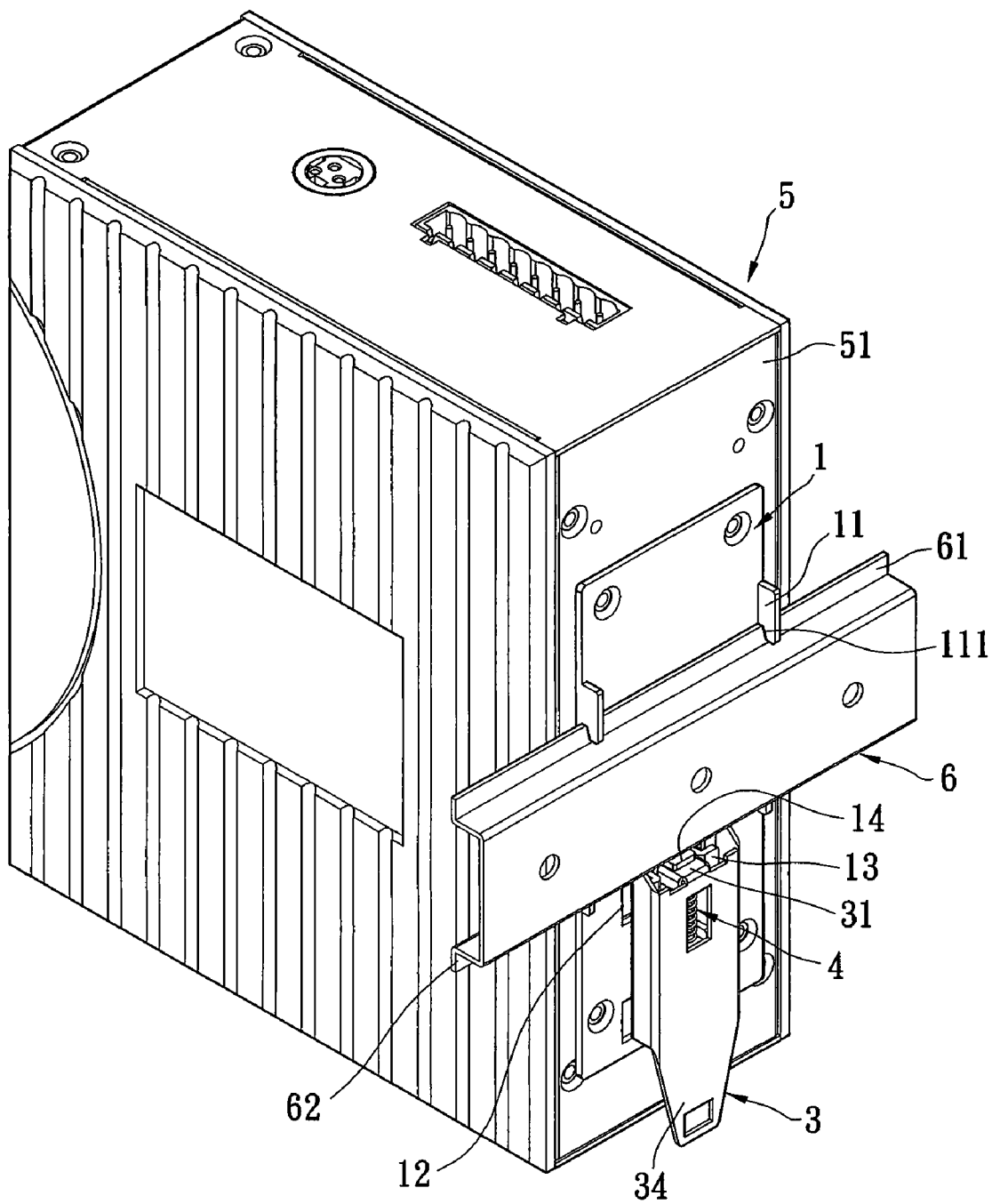
FIG. 5 is another schematic view showing an operating state of the fixing device for an industrial communication product according to the present invention.

Please refer to FIGS. 2 to 5. The present invention is to provide a fixing device for an industrial communication product, which is disposed on a casing 51 of an industrial communication product 5 for fixing the industrial communication product 5 to an industrial rail 6. The fixing device for an industrial communication product includes a fixing plate 1, at least one elastic piece 2, a pulling element 3, and an elastic element 4. The fixing plate 1 is connected to the casing 51 via screws. In the present embodiment, the fixing plate 1 is provided with two hooks 11, four slots 12, four first connecting portions 13, a stopping block 14, and a first compressing portion 15. The two hooks 11 are provided on two opposite sides of the fixing plate 1. A notch 111 is formed between the hook 11 and the fixing plate 1. The hook 11 can be hooked on a holder 61 provided on the top of the industrial rail 6. The four slots 12 are formed into a rectangular shape respectively and juxtaposed in two pairs. The first connecting portion 13 is formed into a plate formed by extending and bending from a side wall of the slot 12. A runner 131 is formed between the first connecting portion 13 and the slot 12. The stopping block 14 is formed into a plate shape and is positioned to face the U-shaped first compressing portion 15.

In the present embodiment, the number of elastic pieces 2 is two. The cross section of the elastic piece 2 is formed into a U shape. The elastic piece 2 has a sheet-like fixing portion 21 and a bending portion 22. An end of the bending portion 22 is connected to the fixing portion 21. The other end of the bending portion 22 is bent to form an end 221 acting as a stopper. The fixing portion 21 and the bending portion 22 are received in the slot 12.

In the present embodiment, the pulling element 3 is a metallic plate. The pulling element 3 has a second compressing portion 31, two stoppers 32, four second connecting portions 33 and a pulling portion 34. The second compressing portion 31 is formed into an inverted U shape (FIG. 2) on the top of the pulling element 3. The second compressing portion 31 is provided between the stopping block 14 and the first compressing portion 15. The two stoppers 32 are formed on the top end of each side of the pulling element 3 respectively. The four second connecting portions 33 are each shaped as a plate and are disposed slidingly in the runner 131 of the corresponding first connecting portion 13. The end 221 of each of the two elastic pieces 2 abuts one surface of the second connecting portion 33. The pulling portion 34 is located on the bottom end of the pulling element 3, so that a user can pull or release the pulling element 34.

In the present embodiment, the elastic element 4 is a spring. Both ends of the elastic elements 4 abut the first compressing portion 15 of the fixing plate 1 and the second compressing portion 31 of the pulling element 3 respectively.

Figure 6A:
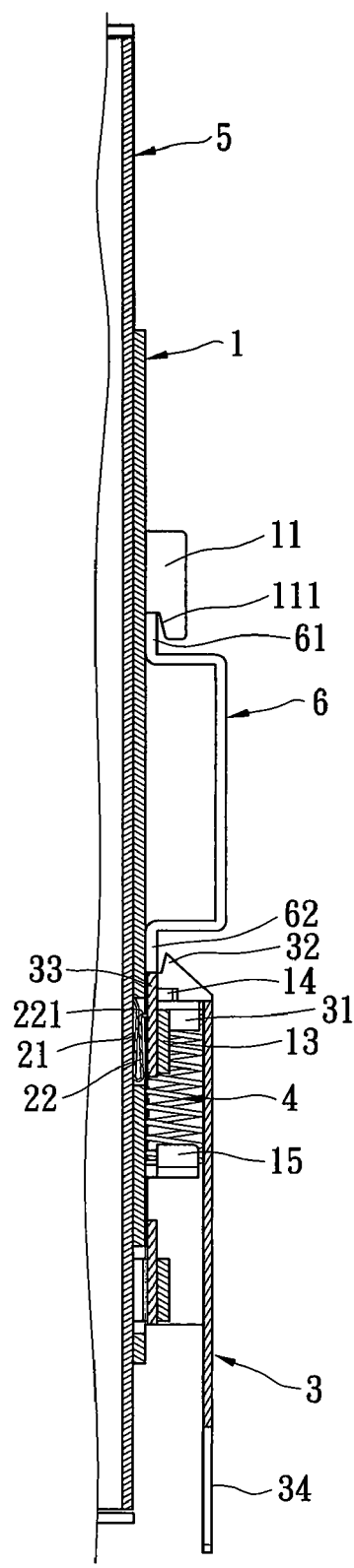
FIG. 6A is a schematic view showing the action of the fixing device for an industrial communication product according to the present invention.
Figure 6B:
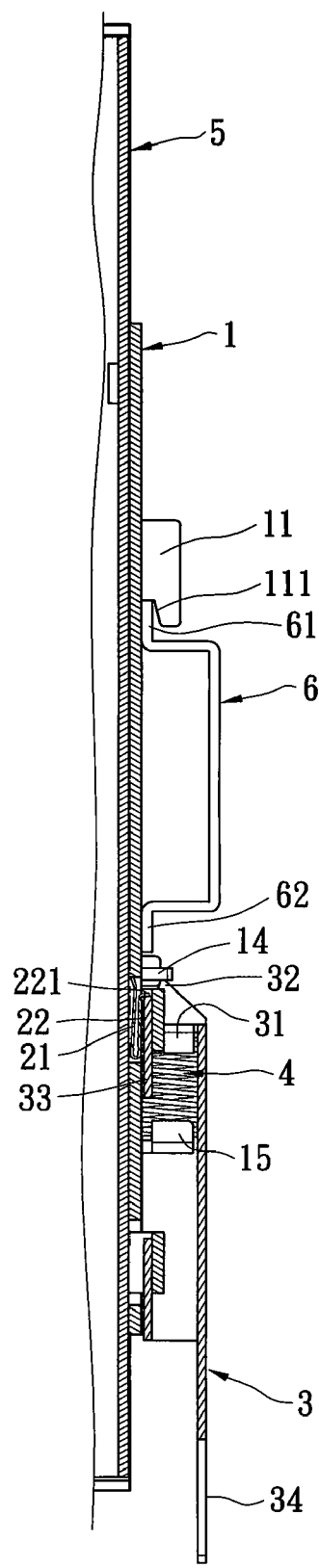
FIG. 6B is another schematic view showing the action of the fixing device for an industrial communication product according to the present invention.

Please refer to FIGS. 6A and 6B. The pulling element 3 is moved between a first position and a second portion. When the pulling element 3 is in the first position as shown in FIG. 6A, the end 221 of the elastic piece 2 abuts one surface of the second connecting portion 33. The second compressing portion 31 of the pulling element 3 abuts the stopping block 14. The stopper 32 of the pulling element 3 blocks a corresponding stopper 62 provided on the bottom of the industrial rail 6. At this time, the industrial communication product 5 is fixed to the industrial rail 6 to become locked. When the user pulls the pulling element 3 downwards via the pulling portion 34, the pulling element 3 will move to the second position as shown in FIG. 6B, the second compressing portion 31 compresses the elastic element 4, so that the stopper 32 of the pulling element 3 is moved away from the corresponding stopper 62 of the industrial rail 6. The second connecting portion 33 is released from the abutment of the two elastic pieces 2. Due to its elastic recovering force, the elastic piece 2 makes the end 221 to be stopped at the top of the second connecting portion 33, thereby positioning the pulling element 3 to the second position. At this time, the industrial communication product 5 is unlocked.

Figure 7:
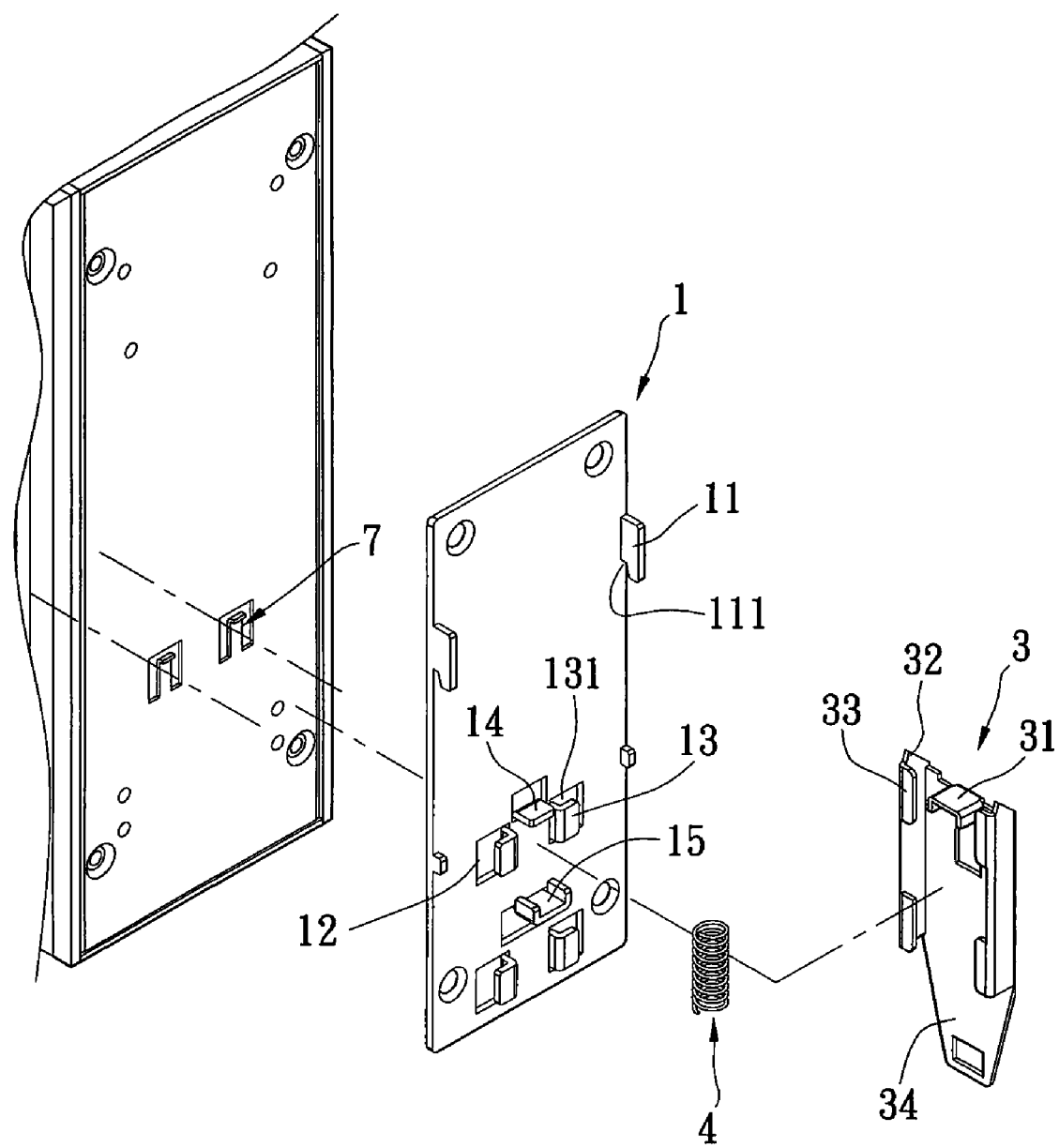
FIG. 7 is an exploded perspective view showing the fixing device for an industrial communication product according to the second embodiment of the present invention.

Please refer to FIG. 7, which is an exploded perspective view of the second embodiment of the present invention. The difference between the second embodiment and the first embodiment lies in that: the two elastic pieces 7 are integrally formed with the casing 51 of the industrial communication product 5.

Figure 8:
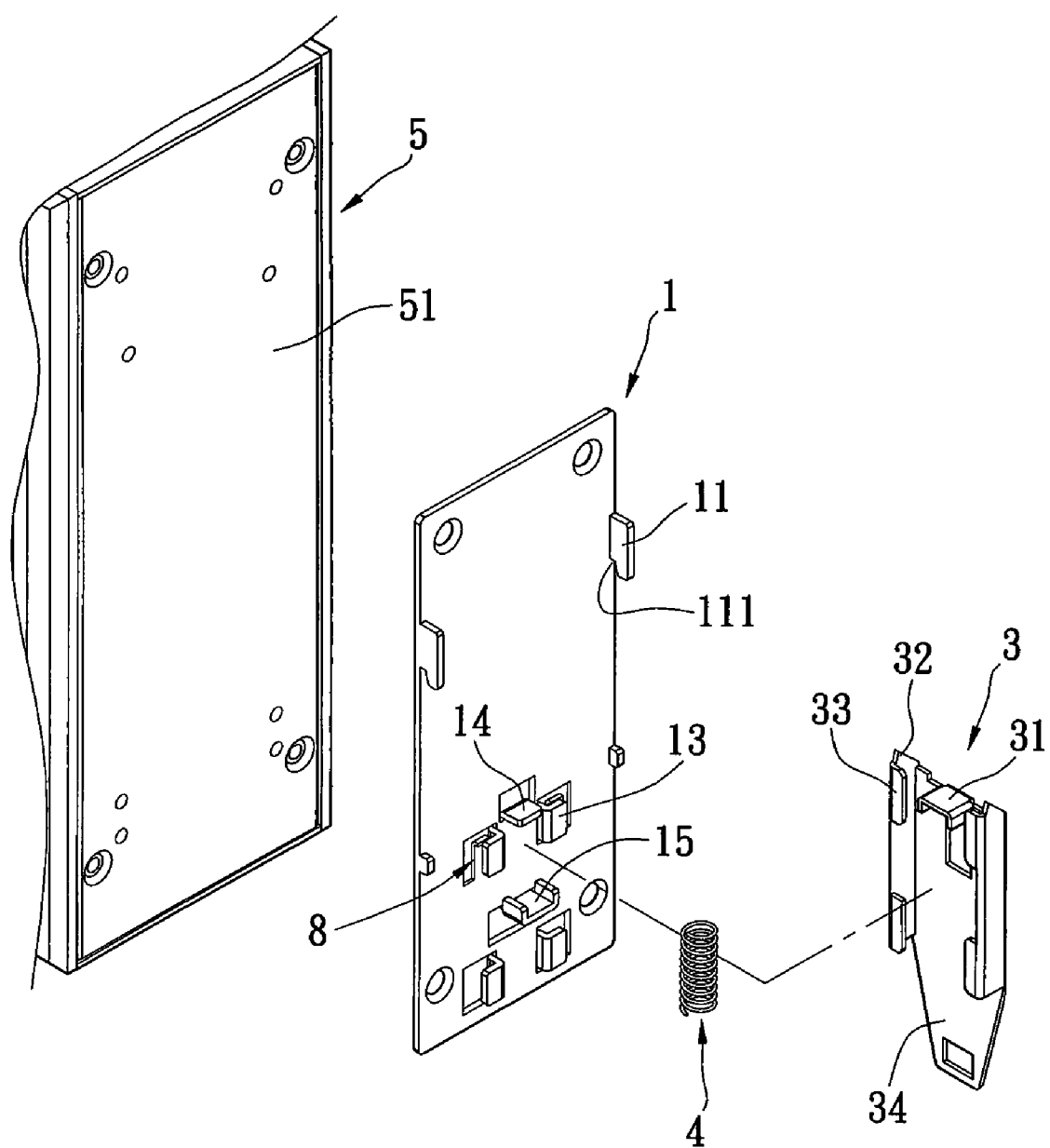
FIG. 8 is an exploded perspective view showing the fixing device for an industrial communication product according to the third embodiment of the present invention.

Please refer to FIG. 8, which is an exploded perspective view of the third embodiment of the present invention. The difference between the third embodiment and the first embodiment lies in that: the two elastic pieces 8 are integrally formed with the fixing plate 1.

Figure 9:
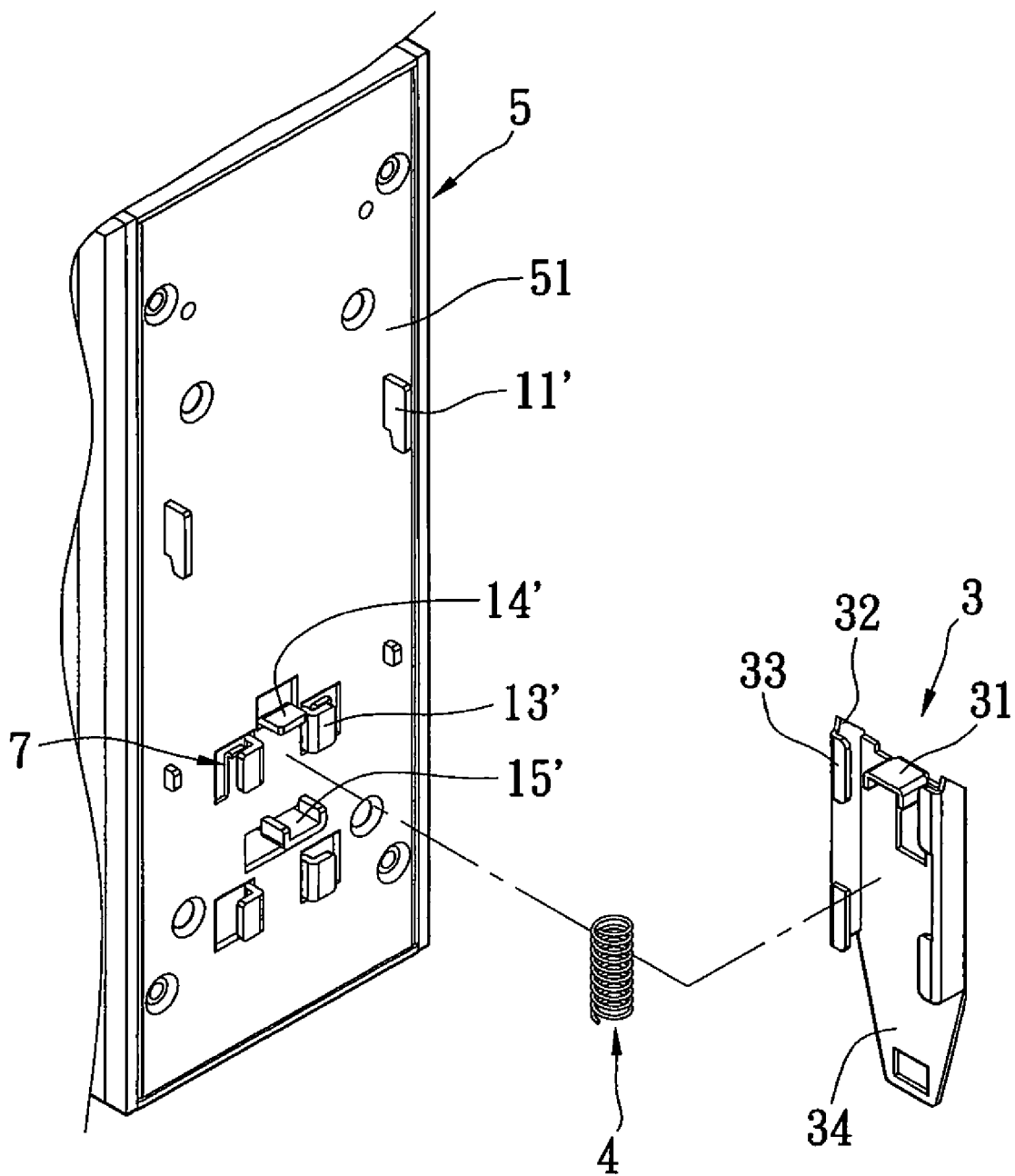
FIG. 9 is an exploded perspective view showing the fixing device for an industrial communication product according to the fourth embodiment of the present invention.

Please refer to FIG. 9, which is an exploded perspective view of the fourth embodiment of the present invention. The difference between the fourth embodiment and the second embodiment (FIG. 7) lies in that: the casing 51 of the industrial communication product 5 is provided with two hooks 11', four first connecting portions 13', a stopping block 14' and a first compressing portion 15'. The two hooks 11' are provided in the vicinity of both sides of the casing 51.

In the present invention, the two elastic pieces 2 are disposed with respect to the first connecting portion 13 and each of the elastic pieces 2 has an end 221. The second connecting portion 33 is slidingly connected to the first connecting portion 13. When the pulling element 3 is in the first position, the end 221 of the elastic piece 2 abuts the second connecting portion 33. When the pulling element 3 is pulled downwards to be located in the second position, the end 221 of the elastic piece 2 will be stopped by the top of the second connecting portion 33. Via this arrangement, the pulling element 3 can be positioned to the second position to make the industrial communication product 5 unlocked. At this time, the user can remove the industrial communication product 5 from the industrial rail 6 easily to repair, test, expand or upgrade it. Further, the user can be protected from getting hurt during the above-mentioned process.

The above-mentioned descriptions represent merely the preferred embodiment of the present invention, without any intention to limit the scope of the present invention thereto. Various equivalent changes, alternations or modifications based on the claims of present invention are all consequently viewed as being embraced by the scope of the present invention.

What is claimed is:

1. A fixing device for an industrial communication product, provided on a casing of the industrial communication product, the fixing device comprising:
    a fixing plate provided on the casing, the fixing plate being provided with at least one hook, at least two first connecting portions, a stopping block, and a first compressing portion, the stopping block being disposed to face the first compressing portion;
    at least two elastic pieces respectively disposed with respect to the first connecting portions, each of the elastic pieces having an end portion;
    a pulling element provided with a second compressing portion, two stoppers, and at least two second connecting portions corresponding to the two first connecting portions, the second compression portion being provided between the stopping block and the first compressing portion, the two stoppers being provided on both sides of the pulling element, the second compressing portion abutting the stopping block, each of the two second connecting portions being slidingly disposed between the corresponding first connecting portions and the corresponding elastic piece, the pulling element being movable between a first position and a second position,
    wherein the end portion of the elastic piece is pressed by one side surface of the second connecting portion when the pulling element is in the first position,
    wherein the end portion of the elastic piece is released from being pressed by the side surface of the second connecting portion and simultaneously recoveries to abut against a top of the second connecting portion when the pulling element is sliding from the first position to the second position so as to position the pulling element on the second position; and
    an elastic element with both ends abutting the first compressing portion and the second compressing portion respectively.

2. The fixing device for an industrial communication product according to claim 1, wherein the number of hooks is two, the two hooks are provided on two opposite sides of the fixing plate.

3. The fixing device for an industrial communication product according to claim 1, wherein the fixing plate is provided with four slots, the first connecting portion is bent and formed from one side wall of the slot, a runner is formed between the first connecting portion and the slot, the second connecting portion is slidingly provided in the runner.

4. The fixing device for an industrial communication product according to claim 3, wherein the elastic piece has a fixing portion and a bending portion, one end of the bending portion is connected to the fixing portion, the other end of the bending portion is formed into the end portion, the fixing portion and the bending portion are provided in the slot.

5. The fixing device for an industrial communication product according to claim 1, wherein the elastic piece is integrally formed with the casing.

6. The fixing device for an industrial communication product according to claim 1, wherein the elastic piece is integrally formed with the fixing plate.

7. A fixing device for an industrial communication product, provided on a casing of the industrial communication product, the fixing device comprising:
    at least one hook provided on the casing;
    at least two first connecting portions provided on the casing;
    a stopping block provided on the casing;
    a first compressing portion provided on the casing, the first compressing portion being positioned to face the stopping block;
    at least two elastic pieces integrally formed with the casing, the elastic pieces being respectively positioned to face the first connecting portions, each of the elastic pieces having an end portion;
    a pulling element provided with a second compressing portion, two stoppers and at least two second connecting portions corresponding to the two first connecting portions, the second compressing portion being provided between the stopping block and the first compressing portion, the two stoppers being provided on both sides of the pulling element, each of the two second connecting portions being slidingly disposed between the corresponding first connecting portion and the corresponding elastic piece, the pulling element being movable between a first position and a second position,
    wherein the end portion of the elastic piece is pressed by one side surface of the second connecting portion when the pulling element is in the first position,
    wherein the end portion of the elastic piece is released from being pressed by the side surface of the second connecting portion and simultaneously recoveries to abut against a top of the second connecting portion when the pulling element is sliding from the first position to the second position so as to position the pulling element on the second position; and
    an elastic element with both ends abutting the first compressing portion and the second compressing portion respectively.

* * * * *